US008674547B2

(12) United States Patent
Shen

(10) Patent No.: US 8,674,547 B2
(45) Date of Patent: Mar. 18, 2014

(54) THREE-DIMENSIONAL WIND-LIGHT CONGREGATING POWER GENERATING SYSTEM WITH SPHERICAL JOINTS

(76) Inventor: Weiqing Shen, Shanghai (CN)

( * ) Notice: Subject to any disclaimer, the term of this patent is extended or adjusted under 35 U.S.C. 154(b) by 347 days.

(21) Appl. No.: 13/260,566

(22) PCT Filed: Dec. 16, 2008

(86) PCT No.: PCT/CN2008/073521
§ 371 (c)(1),
(2), (4) Date: Sep. 26, 2011

(87) PCT Pub. No.: WO2009/117893
PCT Pub. Date: Oct. 1, 2009

(65) Prior Publication Data
US 2012/0086279 A1    Apr. 12, 2012

(30) Foreign Application Priority Data
Mar. 26, 2008 (CN) .......................... 2008 1 0035181

(51) Int. Cl.
*H02J 7/34* (2006.01)
*F03D 9/00* (2006.01)
(52) U.S. Cl.
USPC ........................................................ 307/72
(58) Field of Classification Search
USPC ............................................. 307/72; 290/55
See application file for complete search history.

(56) References Cited

U.S. PATENT DOCUMENTS

| 4,486,143 A * | 12/1984 | McVey | 415/164 |
| 7,045,702 B2 * | 5/2006 | Kashyap | 136/244 |
| 2008/0143117 A1 * | 6/2008 | Shen et al. | 290/55 |

* cited by examiner

*Primary Examiner* — Rexford Barnie
*Assistant Examiner* — Daniel Kessie
(74) *Attorney, Agent, or Firm* — Matthias Scholl P.C.; Matthias Scholl

(57) ABSTRACT

A three-dimensional wind-light congregating power generating system with spherical joints includes a spherical joint wind-light congregating device (10), a spherical joint wind-light trapping device (20), both of which are assembled through spherical joints, and a vertical axis wind generator (30), wherein the profile of the spherical joint wind-light congregating device (10) is the shape of rectangular paralleling and comprises four wind lateral guiding boards (15) equally spaced around a center, a gradually narrowing wind inlet passage (150) is formed between adjacent wind lateral guiding boards (15), and the wind inlets of the wind inlet passages (150) are located respectively at the four sides of the spherical joint wind-light congregating device (10); the spherical joint wind-light trapping device (20) comprises wind-light trapping rods (22) and wind-light trapping films (21) for absorbing solar energy; the vertical axis wind generator (30) is mounted in the center of the spherical joint wind-light congregating device (10). The present power generating system applies an assembled structure with spherical joints, the components of the system can be produced in standardization and be assembled together by simple tools, and a plurality of miniwatt power generating systems can be assembled to a high power generating system; the power generating system can generate electricity efficiently all day even in the condition of gentle breeze and weak light.

22 Claims, 5 Drawing Sheets

THREE-DIMENSIONAL WIND-LIGHT CONGREGATING POWER GENERATING SYSTEM WITH SPHERICAL JOINTS

FIELD OF THE INVENTION

The invention relates to a wind power generating system and more particularly, to a socket joint-typed three-dimensional wind-solar congregating power generating system.

BACKGROUND OF THE INVENTION

Conventional methods for obtaining electric energy include the burning fossil fuels. However, the burning of fossil fuels often produces greenhouse gases and thus seriously affects the global climate and pollutes the environment. Wind power generation solves the above-mentioned problems and saves non-renewable resources, and in contrast to nuclear power generation, hydropower generation, and thermal power generation, it is very economic in construction cost and occupancy area.

The global wind energy reserves are very large and theoretically, 1% of the wind energy reserves can meet the demand of human beings. But due to lacking a wind catcher, conventional wind power generating systems have a low efficiency.

When wind drives blades to rotate, power is generated. However, the blades can only absorb less than 30% wind energy when wind blows the blades. The rest 70% wind energy disappears between the blades. More seriously, due to the disorder of the airflow and the non-uniform action thereof on the blades, the 30% wind energy counteracts with each other and thus a lot of energy is wasted. Therefore, conventional wind power generating systems have a low efficiency and cannot use low velocity wind to generate power.

To solve the problems, improvements on conventional wind power generators are made. Increasing pole height and blade length improves the power generation efficiency of a wind power generating system, but results in a bulky system and a high production cost.

Furthermore, the parts of conventional wind-solar power generating systems are generally non-detachable, which means a high occupying and transportation cost.

Chinese Patent Application No. 200620049113.1 discloses a wind power generator that can employ low velocity wind to generate power with high safety.

SUMMARY OF THE INVENTION

One objective of the invention is to provide a socket joint-typed three-dimensional wind-solar congregating power generating system that is detachable and features a high efficiency.

To achieve the above objective, in accordance with one embodiment of the invention, there is provided a socket joint-typed three-dimensional wind-solar congregating power generating system, comprising a wind-solar aggregator, a vertical axis wind power generator, and a wind-solar catcher, wherein the wind-solar aggregator is square-shaped and comprises four equally spaced lateral wind guide plates which surround a center, between two adjacent lateral wind guide plates forms a diminishing wind inlet channel, and a wind inlet of the diminishing wind inlet channel faces a corresponding side of the wind-solar aggregator; the vertical axis wind power generator is disposed at the center of the wind-solar aggregator and a wind outlet of the wind inlet channel of the wind-solar aggregator is connected to a wind inlet of a blade of the vertical axis wind power generator; the wind-solar catcher comprises eight wind catching rods and a plurality of wind-solar catching films that absorb solar energy, and the eight wind catching rods are connected to and extend radially from eight socket joints disposed at the corner of the wind-solar aggregator, respectively; between two adjacent wind catching rods disposed is the wind-solar catching film and thus a bell mouth structure forms by four wind-solar catching films at a side of the wind-solar aggregator; and the bell mouth structure cooperates with a corresponding wind inlet channel of the wind-solar aggregator and functions as a wind catching channel thereof.

In a class of this embodiment, the system further comprises a controller that controls the conversion of electric energy and an energy storage device for storing electric energy.

In a class of this embodiment, the wind-solar aggregator comprises four central vertical rods, four lateral vertical rods, eight transverse rods, eight 45° transverse rods, an upper fixing plate, and a lower fixing plate. The four central vertical rods equally spaced surround and axially parallel the vertical axis wind power generator, an upper end of each rod being fixed to the upper fixing plate, and a lower end of each rod being fixed to the lower fixing plate. One end of each of four 45° transverse rods connects to the upper fixing plate and another end thereof connects to the socket joints disposed at an upper corner of the wind-solar aggregator. One end of each of another four 45° transverse rods connects to the lower fixing plate and another end thereof connects to the socket joints disposed at a lower corner of the wind-solar aggregator. Four transverse rods are disposed between two adjacent socket joints disposed at the upper corner of the wind-solar aggregator, and another four transverse rods are disposed between two adjacent socket joints disposed at the lower corner of the wind-solar aggregator. Each of the four lateral vertical rods is disposed between an upper socket joint and a corresponding lower socket joint of the wind-solar aggregator. Each lateral wind guide plate is disposed between the lateral vertical rod and a corresponding central vertical rod.

In a class of this embodiment, the blades of the vertical axis wind power generator are disposed on the lower fixing plate rotatably.

In a class of this embodiment, the transverse rods and 45° transverse rods are connected to the socket joints via an adjustable screw.

In a class of this embodiment, the wind catching rods are connected to the socket joints via an adjustable screw.

In a class of this embodiment, the lower fixing plate is fixed to a pillar.

In a class of this embodiment, the system is installed beside a building group.

In accordance with another embodiment of the invention, there provided is another socket joint-typed three-dimensional wind-solar congregating power generating system, comprising a plurality of wind-solar aggregators, a plurality of vertical axis wind power generators, and a wind-solar catcher, wherein each of the wind-solar aggregators is square-shaped and comprises four equally spaced lateral wind guide plates which surround a center, between two adjacent lateral wind guide plates forms a diminishing wind inlet channel, and a wind inlet of the diminishing wind inlet channel faces a corresponding side of the wind-solar aggregator, and all the aggregators are combined integratedly using a plurality of socket joints to yield an aggregator group; each of the vertical axis wind power generators is disposed at the center of the wind-solar aggregator and a wind outlet of the wind inlet channel of the wind-solar aggregator is connected to a wind inlet of a blade of the vertical axis wind power generator; the wind-solar catcher comprises eight wind catching rods and a plurality of wind-solar catching films that absorb solar energy, and the eight wind catching rods are connected to and extend radially from eight socket joints disposed at the corner of the aggregator group, respectively; between two adjacent wind catching rods disposed is the wind-solar catching film and thus a bell mouth structure forms by four wind-solar catching films at a side of the aggregator group; and the bell mouth structure cooperates with a corresponding wind inlet channel of the aggregator group and functions as a wind catching channel thereof.

In a class of this embodiment, the system further comprises a controller that controls the conversion of electric energy and an energy storage device for storing electric energy.

In a class of this embodiment, each of the wind-solar aggregators comprises four central vertical rods, four lateral vertical rods, eight transverse rods, eight 45° transverse rods, an upper fixing plate, and a lower fixing plate. The four central vertical rods equally spaced surround and axially parallel the vertical axis wind power generator, an upper end of each rod being fixed to the upper fixing plate, and a lower end of each rod being fixed to the lower fixing plate. One end of each of four 45° transverse rods connects to the upper fixing plate and another end thereof connects to the socket joints disposed at an upper corner of the wind-solar aggregator. One end of each of another four 45° transverse rods connects to the lower fixing plate and another end thereof connects to the socket joints disposed at a lower corner of the wind-solar aggregator. Four transverse rods are disposed between two adjacent socket joints disposed at the upper corner of the wind-solar aggregator, and another four transverse rods are disposed between two adjacent socket joints disposed at the lower corner of the wind-solar aggregator. Each of the four lateral vertical rods is disposed between an upper socket joint and a corresponding lower socket joint of the wind-solar aggregator. Each lateral wind guide plate is disposed between the lateral vertical rod and a corresponding central vertical rod.

In a class of this embodiment, the blades of each of the vertical axis wind power generators are disposed on the lower fixing plate rotatably.

In a class of this embodiment, the transverse rods and 45° transverse rods are connected to the socket joints via an adjustable screw.

In a class of this embodiment, the wind catching rods are connected to the socket joints via an adjustable screw.

In a class of this embodiment, the lower fixing plate is fixed to a pillar.

In a class of this embodiment, the aggregator group comprises a plurality of the wind-solar aggregators combined with each other vertically and horizontally.

In a class of this embodiment, the aggregator group comprises eight wind-solar aggregators.

In a class of this embodiment, two adjacent wind-solar aggregators are combined by a shared side.

In a class of this embodiment, the system is installed beside a building group.

In a class of this embodiment, two adjacent wind-solar aggregators have a shared socket joint at an adjacent corner.

In a class of this embodiment, the aggregator group comprises a plurality of the wind-solar aggregators combined with each other vertically, in which the lower fixing plate of an upper wind-solar aggregator is the upper fixing plate of a lower wind-solar aggregator.

Advantages of the invention are summarized below. The socket joint-typed three-dimensional wind-solar congregating power generating system can employ wind and solar energy, comprising following wind, contrary wind, and weak sunlight, for power generation simultaneously, thereby having a high efficiency. The components of the system, that is, the wind-solar aggregator, the vertical axis wind power generator, and the wind-solar catcher, all are made separately and then transported to a destination for assembly, thereby reducing the production cost, occupied area, and production period. Furthermore, the system increases electric energy production only through increasing the length of the wind catching rods and wind-solar catching films.

BRIEF DESCRIPTION OF THE DRAWINGS

The invention is described hereinbelow with reference to accompanying drawings, in which.

DETAILED DESCRIPTION OF THE EMBODIMENTS

Figure 1:
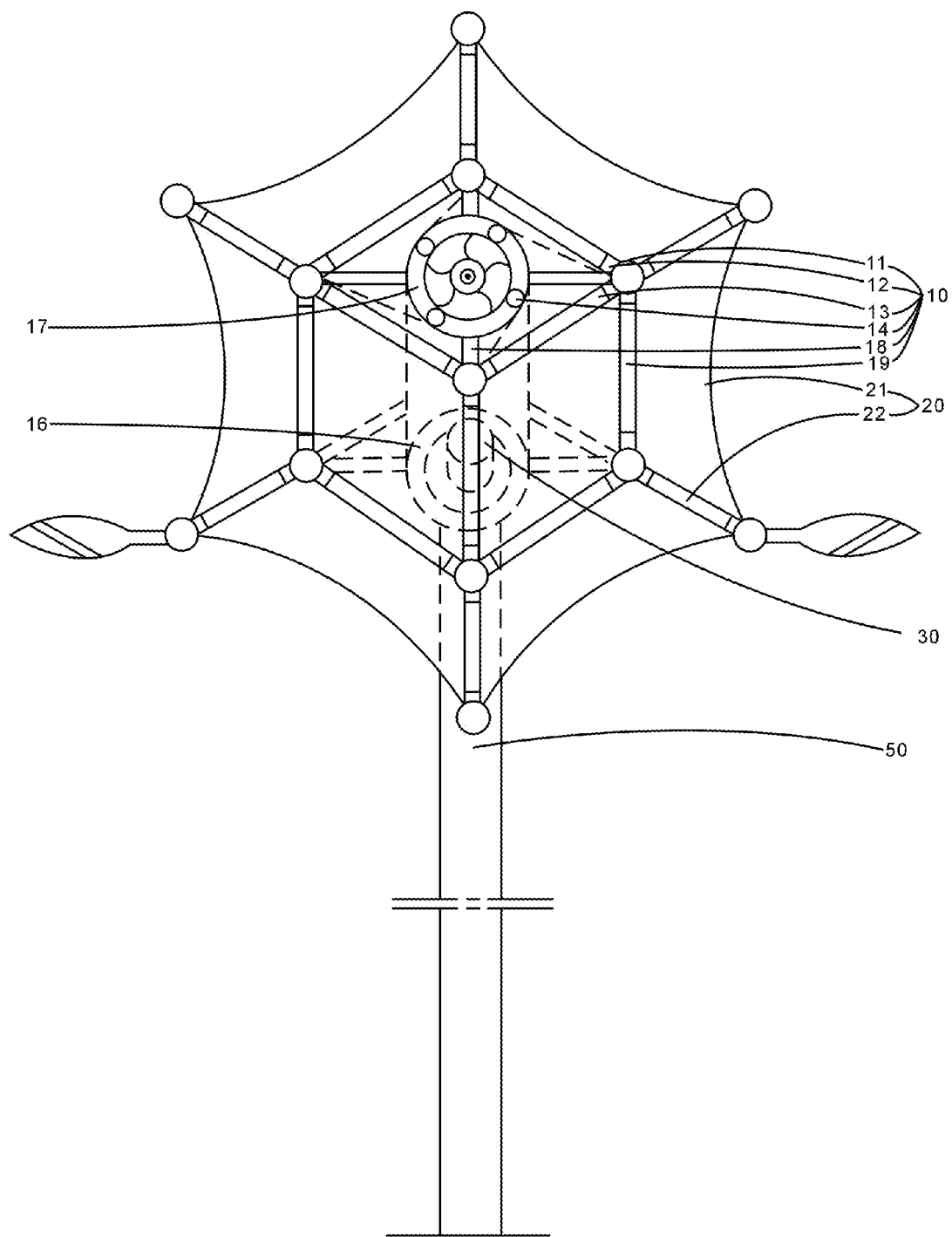
FIG. 1 is a schematic diagram of a socket joint-typed three-dimensional wind-solar congregating power generating system according to one embodiment of the invention.
Figure 2:
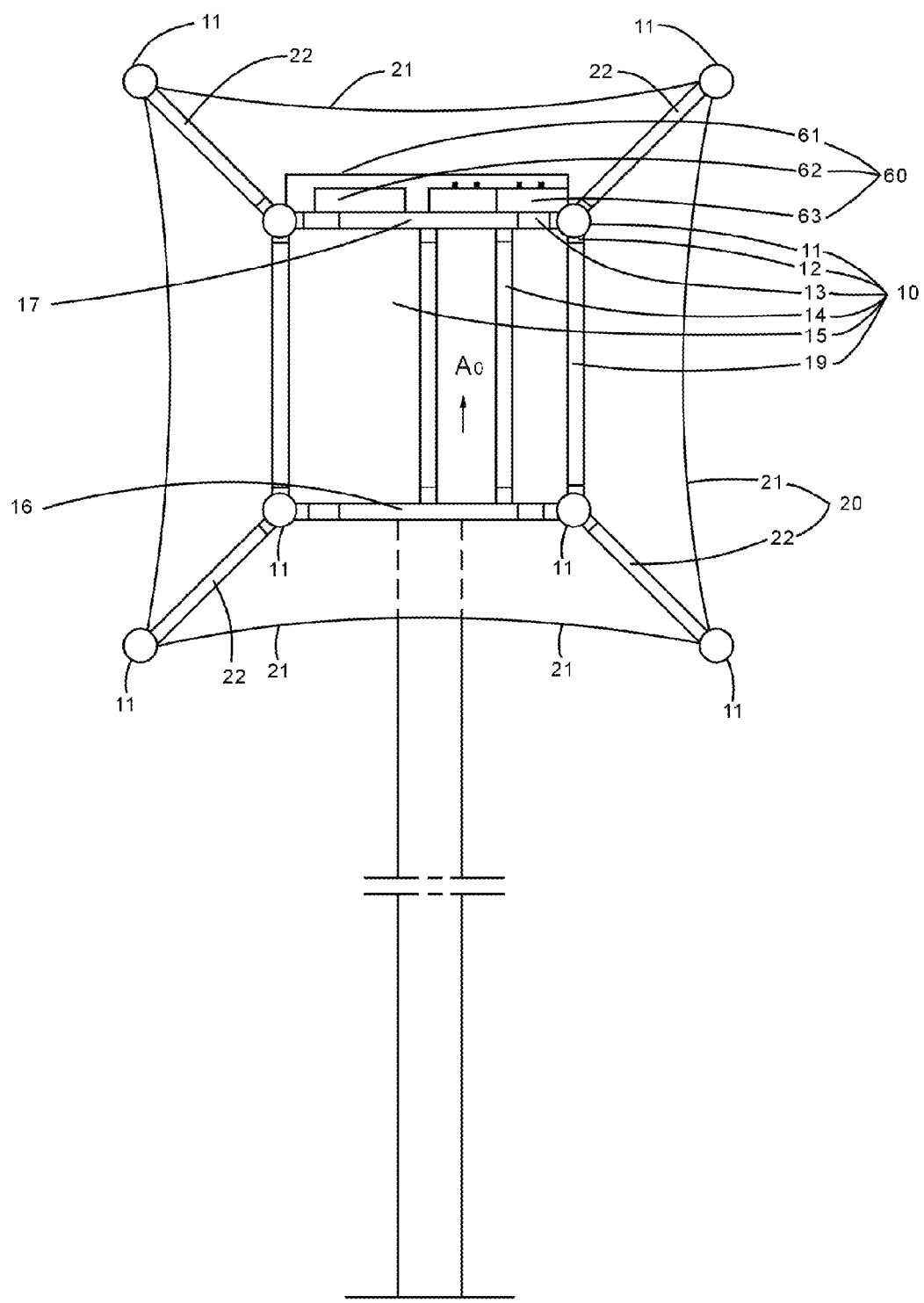
FIG. 2 is a front view of FIG. 1.

For further illustrating the invention, experiments detailing a socket joint-typed three-dimensional wind-solar congregating power generating system are described below. It should be noted that the following examples are intended to describe and not to limit the invention. Technical terms involved in the invention refer to any practicable means, for example, "connection"refers to a direct connection between two components or an indirect connection via a connection device.

As shown in FIGS. 1-3 and 5, a socket joint-typed three-dimensional wind-solar congregating power generating system comprises a wind-solar aggregator 10, a vertical axis wind power generator 30, and a wind-solar catcher 20. FIG. 6 shows another socket joint-typed three-dimensional wind-solar congregating power generating system comprises a plurality of wind-solar aggregators 10, a plurality of vertical axis wind power generators 30, and a wind-solar catcher 20.

As shown in FIGS. 1-3 and 5, the wind-solar aggregator 10 is square-shaped and comprises four equally spaced lateral wind guide plates 15 which surround a center. Between two adjacent lateral wind guide plates 15 forms a diminishing wind inlet channel 150. A wind inlet of the diminishing wind inlet channel 150 faces a corresponding side of the wind-solar aggregator 10.

The wind-solar aggregator 10 comprises four central vertical rods 14, four lateral vertical rods 19, eight transverse rods 13, eight 45° transverse rods 18, an upper fixing plate 17, and a lower fixing plate 16. The four central vertical rods 14 equally spaced surround and axially parallel the vertical axis wind power generator 30, an upper end of each rod being fixed to the upper fixing plate 17, a lower end of each rod being fixed to the lower fixing plate 16. One end of each of four 45° transverse rods 18 connects to the upper fixing plate 17 and another end thereof connects to the socket joints 11 disposed at an upper corner of the wind-solar aggregator 10. One end of each of another four 45° transverse rods 18 connects to the lower fixing plate 16 and another end thereof connects to the socket joints 11 disposed at a lower corner of the wind-solar aggregator 10. Four transverse rods 13 are disposed between two adjacent socket joints 11 disposed at the upper corner of the wind-solar aggregator 10, and another four transverse rods 13 are disposed between two adjacent socket joints 11 disposed at the lower corner of the wind-solar aggregator 10. Each of the four lateral vertical rods 19 is disposed between an upper socket joint 11 and a corresponding lower socket joint 11 of the wind-solar aggregator 10. Each lateral wind guide plate 15 is disposed between the lateral vertical rod 19 and a corresponding central vertical rod 14. The connections between the socket joint 11 and 45° transverse rod 18, the transverse rod 13, and the lateral vertical rod 19 are achieved using an adjustable screw 12.

The wind-solar aggregator 10 is fixed to a pillar 50 via the lower fixing plate 16. The vertical axis wind power generator 30 is disposed at the center of the wind-solar aggregator 10 and fixed to the lower fixing plate 16, comprising a major axis 32, a plurality of blades 31, and a drive system 33. The blades 31 surround the major axis 32 rotatably.

Figure 3:
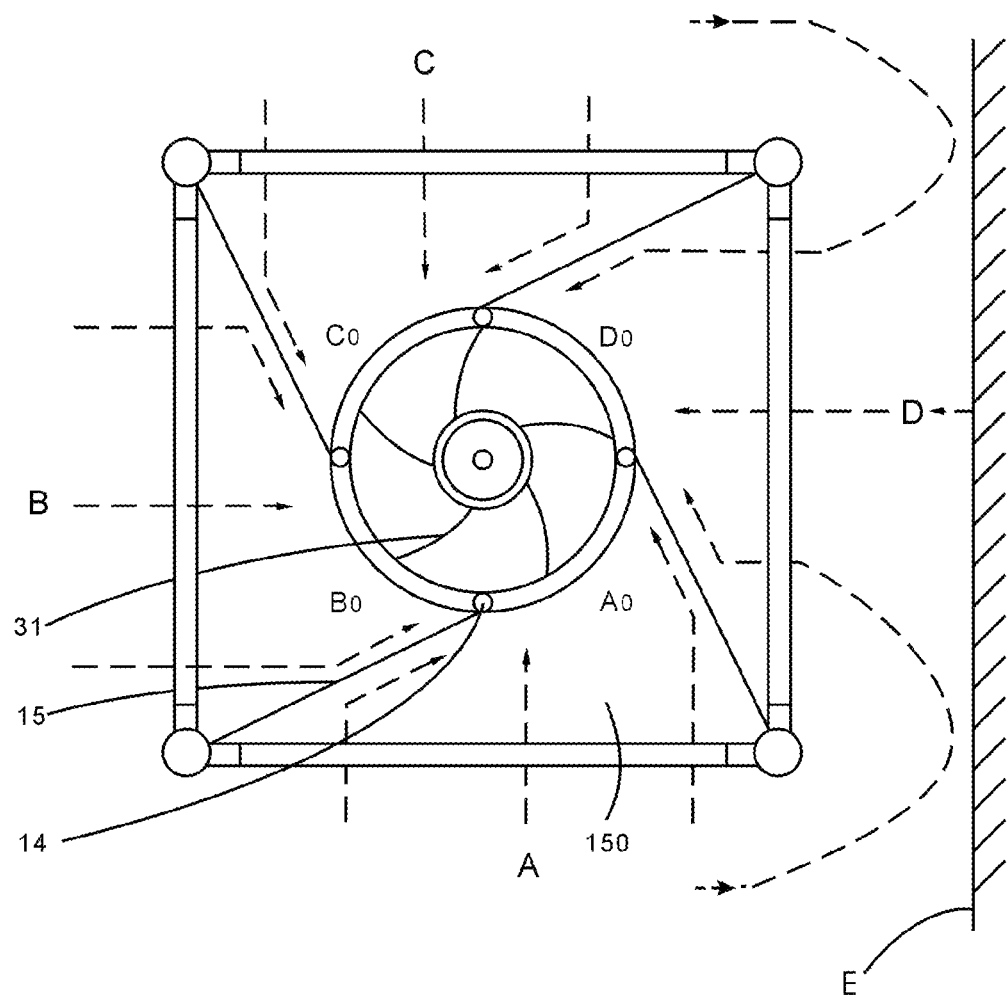
FIG. 3 is a top view of a wind-solar aggregator according to one embodiment of the invention, which has four wind inlet channels and each of the channel disposed is a lateral wind guide plate, wind energy is absorbed regardless of the wind direction and converted into electric energy.

The four wind inlet channels 150 absorb wind around the vertical wind power generator 30 in all directions. As shown in FIG. 3, if wind blows along the direction of A, B, C, or D, it will enter the wind inlet channel 150 formed between two adjacent lateral wind guide plates 15. The wind inlet channel 150 is a diminishing bell mouth structure and collects wind energy to the greatest extent.

The collected wind energy flows through the off-center and diminishing wind inlet channel and therein is strengthened. Consequently, the outlet wind is high-pressure and potent, and the energy thereof is twice that of the inlet wind. Thus, the wind-solar aggregator 10 accelerates the wind velocity (V) and increases the wind area (A) and air density (ρ). The formula $W=\frac{1}{2}\rho V^3 A$ (W represents wind energy) shows that the wind energy is proportional to the wind area (A), the air density (ρ), and the cube of wind velocity (V). If the wind velocity is doubled, the output power of a wind power generator increases eightfold. That is to say, if the velocity of the outlet wind is double that of the inlet wind, the output power of a wind power generator increases eightfold.

Figure 5:
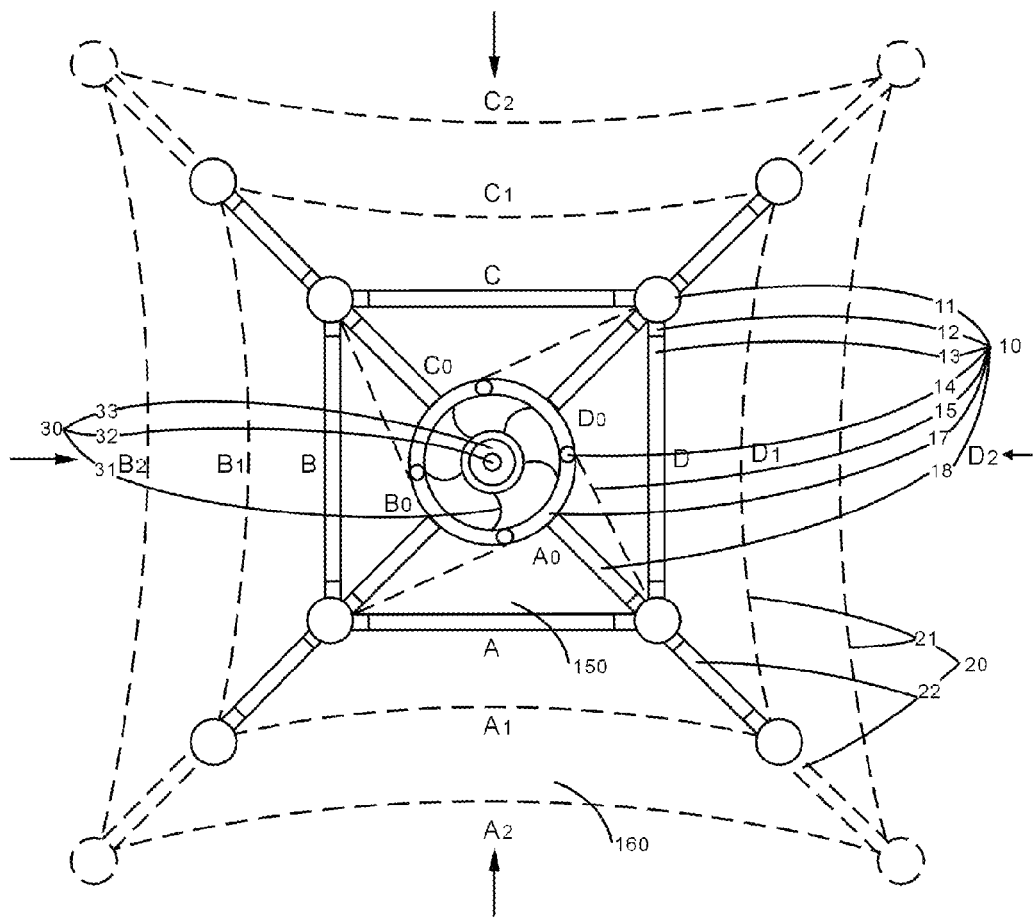
FIG. 5 is an unfolded view of a wind-solar catcher according to one embodiment of the invention, which comprises eight wind catching rods and a plurality of wind-solar catching films that absorb solar energy; extending the length of the wind catching rods and assembling the corresponding wind-solar catching films thereof increase the generated electric energy.
Figure 6:
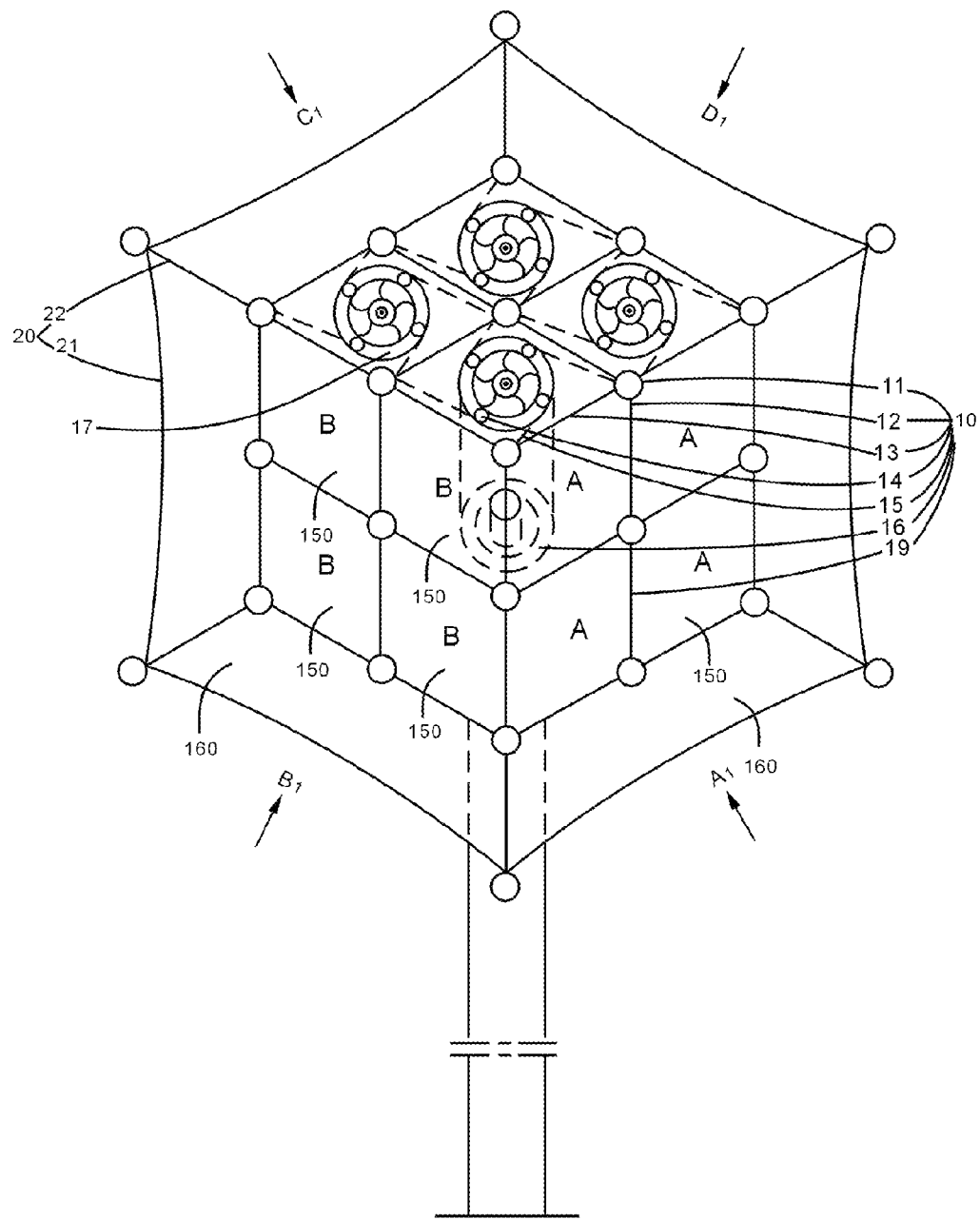
FIG. 6 is a schematic diagram of a high-power socket joint-typed three-dimensional wind-solar congregating power generating system according to one embodiment of the invention.

As shown in FIGS. 1 and 5, the wind-solar catcher 20 comprises eight wind catching rods 22 and a plurality of wind-solar catching films 21 that absorb solar energy. The eight wind catching rods 22 are connected to and extend radially from eight socket joints 11 disposed at the corner of the wind-solar aggregator 10, respectively. Between two adjacent wind catching rods disposed is the wind-solar catching film 21 and thus a bell mouth structure 160 forms by four wind-solar catching films 21 at a side of the wind-solar aggregator 10. Totally, for a wind-solar aggregator 10, 12 wind-solar catching films 21 are enough. The bell mouth structure 160 cooperates with each wind inlet channel of the wind-solar aggregator 10 and functions as a wind catching channel thereof. Thus, entering the bell mouth structure 160, wind is caught therein and then flows into the wind inlet channel 150.

As shown in FIG. 5, wind around the wind-solar catcher 20 is absorbed regardless of the wind direction. For example, when wind enters following the direction of $A_1$, due to the diminishing wind inlet channel, the air density increases, high pressure is produced, and wind velocity is accelerated. Furthermore, when wind enters the site $A_0$, together with the action of the lateral wind guide plates 15, the wind energy is more potent and only blows on the wind inlet of a blade, but the other blades are not affected. Thus, the system converts the wind energy into electric energy to the greatest extent.

Extending the length of the wind catching rods 22 and assembling the corresponding wind-solar catching films 21 thereof, or coupling a second wind-solar catcher 20 with a first wind-solar catcher 20, both increase the generated electric energy without increasing the power of the wind power generator. The extending mode is shown in FIG. 5. Because the connection of the components of the invention is mainly achieved using the socket joints, the extending is easy to practice, so is the disassembly. As shown in FIG. 5, after extending the wind-solar catching films 21, the wind catching area is enlarged from $A_1$ to $A_2$. For example, if the wind catching area of $A_1$ is 2×2=4 m², the wind power density is 200 W/m², and then the electric power is 4×200=800 W. If the length of the wind catching rods 22 is extended by 1 m, and the corresponding wind-solar catching films 21 are assembled, the wind catching area of $A_2$ becomes 4×4=16 m². The resultant electric power is 16×200=3200 W, which is four times that of the $A_1$. When the wind catching area is enlarged, so is the solar energy catching area. The wind-solar catching films 21 of the invention are flexible double-sided solar thin films which have high absorbance even in a cloudy day. The wind catching is one-way, but the corresponding solar energy catching is four-ways. Thus, if the wind catching area is 16 m², the corresponding solar energy catching area is 16×4=64 m². Suppose the solar energy electric power is 100 W/m², the total electric power is 64×100=6,400 W. Obviously, the generated electric energy is increased greatly. As shown by the above-mentioned formula: $W=\frac{1}{2}\rho V^3 A$, the wind energy is proportional to the wind area (A), the air density (ρ), and the cube of wind velocity (V). If the wind velocity is doubled, the output power of a wind power generator increases eightfold. The socket joint-typed three-dimensional wind-solar congregating power generating system of the invention increases the wind density, the wind velocity, the wind catching area, and the solar energy catching area. Thus, the system is highly effective for power generation.

Figure 4:
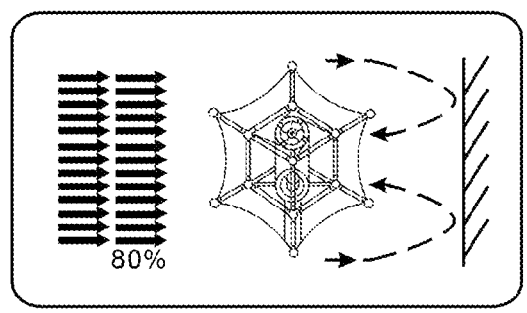
FIG. 4 shows a comparison of power generation efficiency among different wind power generation systems, X represents a conventional vertical axis wind power generation system with an efficiency of just 38%; X+Y represents is the most advanced wind power generation system in the world, which is produced by KR company, Korea, with an efficiency of 60%; X+Y+Z represents a socket joint-typed three-dimensional wind-solar congregating power generating system of the invention with an efficiency of 70-80%.

As shown in FIG. 4, the picture X represents a conventional vertical axis wind power generation system. The blades at the upper half of the broken line suffer the reverse resistance and thus the driving force of the blades at the lower half of the broken line is counteracted. Therefore, the power generation efficiency is just 30%. The picture X+Y represents is the most advanced wind power generation system in the world, which is produced by KR company, Korea. The system reduces the reverse resistance and using side induction part of wind energy can re-collected into the revolving blades, but some wind energy still loses. Therefore, the power generation efficiency is just 60%. The picture X+Y+Z represents a socket joint-typed three-dimensional wind-solar congregating power generating system of the invention. The system converts the reverse resistance into a driving force, so it is a unique two-way wind introduction technology. The wind-solar catching films 21 have a high efficiency and the absorption thereof reaches 10-40% even in the cloudy day. Thus, the wind power generator of the invention can work almost around the clock with an efficiency of 80%.

FIG. 6 shows another socket joint-typed three-dimensional wind-solar congregating power generating system of the invention. The system comprises eight wind-solar aggregators 10, each of which is square-shaped and comprises four equally spaced lateral wind guide plates 15 which surround a center. Between two adjacent lateral wind guide plates 15 forms a diminishing wind inlet channel 150. A wind inlet of the diminishing wind inlet channel 150 faces a corresponding side of the wind-solar aggregator 10. The eight wind-solar aggregators 10 form a square-shaped aggregator group using the socket joints 11. FIG. 6 shows a two-layered aggregator group comprising at least two wind-solar aggregators 10 in the vertical direction. Furthermore, the group may be more than two-layered or one-layered, that is, comprise a plurality of wind-solar aggregator 10 just in the horizontal direction. Obviously, the wind-solar aggregators 10 can be combined vertically, horizontally, or vertically and horizontally. The wind-solar aggregators 10 in FIG. 6 are substantially the same as that in FIG. 1. The wind-solar aggregators 10 in FIG. 6 are preferably low power. At the center of each of the wind-solar aggregator 10 disposed is a vertical axis wind power generator 30, and a wind outlet of the wind inlet channel of the wind-solar aggregator is connected to a wind inlet of a blade of the vertical axis wind power generator 30. The combination of the wind-solar aggregator 10 and the vertical axis wind power generator 30 can also refer to FIG. 1.

The wind-solar catcher 20 in FIG. 6 is substantially the same as that in FIG. 1. The wind-solar catcher 20 comprises eight wind catching rods 22 and a plurality of wind-solar catching films 21 that absorb solar energy. The eight wind catching rods 22 are connected to and extend radially from eight socket joints 11 disposed at the corner of the wind-solar aggregator 10, respectively. Between two adjacent wind catching rods disposed is the wind-solar catching film 21 and thus a bell mouth structure 160 forms by four wind-solar catching films 21 at a side of the wind-solar aggregator 10. The bell mouth structure 160 cooperates with each wind inlet channel of the wind-solar aggregator 10 and functions as a wind catching channel thereof. Thus, entering the bell mouth structure 160, wind is caught therein and then flows into the wind inlet channel 150.

As shown in FIG. 6, a plurality of low power wind power generation systems of the invention can be combined vertically, horizontally, or vertically and horizontally using the socket joints to yield a high-power wind-solar congregating power generating system. For example, eight 500 W low power wind power generator are combined to yield a high-power wind-solar congregating power generating system with a power of 500×8=4,000 W. Similarly, a megawatt-grade power generating system can be produced. The combination method saves a lot of production and transportation cost, occupied area, and reduces the technical difficulty.

The invention claimed is:

1. A socket joint-typed three-dimensional wind-solar congregating power generating system, comprising
   a) a wind-solar aggregator,
   b) a vertical axis wind power generator, and
   c) a wind-solar catcher,
wherein
   said wind-solar aggregator is square-shaped and comprises four equally spaced lateral wind guide plates which surround a center, between two adjacent lateral wind guide plates forms a diminishing wind inlet channel, and a wind inlet of said diminishing wind inlet channel faces a corresponding side of said wind-solar aggregator;
   said vertical axis wind power generator is disposed at the center of said wind-solar aggregator and a wind outlet of said wind inlet channel of said wind-solar aggregator is connected to a wind inlet of a blade of said vertical axis wind power generator; and
   said wind-solar catcher comprises eight wind catching rods and a plurality of wind-solar catching films that absorb solar energy, and said eight wind catching rods are connected to and extend radially from eight socket joints disposed at the corner of said wind-solar aggregator, respectively; between two adjacent wind catching rods disposed is said wind-solar catching film and thus a bell mouth structure forms by four wind-solar catching films at a side of said wind-solar aggregator; and said bell mouth structure cooperates with a corresponding wind inlet channel of said wind-solar aggregator and functions as a wind catching channel thereof.

2. The system of claim 1, further comprising a controller that controls the conversion of electric energy and an energy storage device for storing electric energy.

3. The system of claim 1, wherein
   said wind-solar aggregator comprises four central vertical rods, four lateral vertical rods, eight transverse rods, eight 45° transverse rods, an upper fixing plate, and a lower fixing plate;
   said four central vertical rods equally spaced surround and axially parallel said vertical axis wind power generator, an upper end of each rod being fixed to said upper fixing plate, and a lower end of each rod being fixed to said lower fixing plate;
   one end of each of said four 45° transverse rods connects to said upper fixing plate and another end thereof connects to said socket joints disposed at an upper corner of said wind-solar aggregator;
   one end of each of another four 45° transverse rods connects to said lower fixing plate and another end thereof connects to said socket joints disposed at a lower corner of said wind-solar aggregator;
   four transverse rods are disposed between two adjacent socket joints disposed at the upper corner of said wind-solar aggregator, and another four transverse rods are disposed between two adjacent socket joints disposed at the lower corner of said wind-solar aggregator;
   each of said four lateral vertical rods is disposed between an upper socket joint and a corresponding lower socket joint of said wind-solar aggregator; and
   each lateral wind guide plate is disposed between said lateral vertical rod and a corresponding central vertical rod.

4. The system of claim 3, wherein said blades of said vertical axis wind power generator are disposed on said lower fixing plate rotatably.

5. The system of claim 3, wherein said transverse rods and 45° transverse rods are connected to said socket joints via an adjustable screw.

6. The system of claim 1, wherein said wind catching rods are connected to said socket joints via an adjustable screw.

7. The system of claim 4, wherein said lower fixing plate is fixed to a pillar.

8. The system of claim 1, wherein said system is installed beside a building group.

9. A socket joint-typed three-dimensional wind-solar congregating power generating system comprising:
   a plurality of wind-solar aggregators;
   a plurality of vertical axis wind power generators; and a wind-solar catcher;
wherein
each of the wind-solar aggregators is square-shaped and comprises four equally spaced lateral wind guide plates which surround a center, between two adjacent lateral wind guide plates forms a diminishing wind inlet channel, and a wind inlet of the diminishing wind inlet channel faces a corresponding side of the wind-solar aggregator, and all the aggregators are combined integratedly using a plurality of socket joints to yield a square-shaped aggregator group;

each of the vertical axis wind power generators is disposed at the center of the wind-solar aggregator and a wind outlet of the wind inlet channel of the wind-solar aggregator is connected to a wind inlet of a blade of the vertical axis wind power generator; and the wind-solar catcher comprises eight wind catching rods and a plurality of wind-solar catching films that absorb solar energy, and the eight wind catching rods are connected to and extend radially from eight socket joints disposed at the corner of the aggregator group, respectively; between two adjacent wind catching rods disposed is the wind-solar catching film and thus a bell mouth structure forms by four wind-solar catching films at a side of the aggregator group; and the bell mouth structure cooperates with a corresponding wind inlet channel of the aggregator group and functions as a wind catching channel thereof.

10. The system of claim 8, wherein the system further comprises a controller that controls the conversion of electric energy and an energy storage device for storing electric energy.

11. The system of claim 9, wherein each of the wind-solar aggregators comprises four central vertical rods, four lateral vertical rods, eight transverse rods, eight 45° transverse rods, an upper fixing plate, and a lower fixing plate, the four central vertical rods equally spaced surround and axially parallel the vertical axis wind power generator, an upper end of each rod being fixed to the upper fixing plate, and a lower end of each rod being fixed to the lower fixing plate, one end of each of four 45° transverse rods connects to the upper fixing plate and another end thereof connects to the socket joints disposed at an upper corner of the wind-solar aggregator, one end of each of another four 45° transverse rods connects to the lower fixing plate and another end thereof connects to the socket joints disposed at a lower corner of the wind-solar aggregator, four transverse rods are disposed between two adjacent socket joints disposed at the upper corner of the wind-solar aggregator, and another four transverse rods are disposed between two adjacent socket joints disposed at the lower corner of the wind-solar aggregator, each of the four lateral vertical rods is disposed between an upper socket joint and a corresponding lower socket joint of the wind-solar aggregator, each lateral wind guide plate is disposed between the lateral vertical rod and a corresponding central vertical rod.

12. The system of claim 11, wherein the blades of each of the vertical axis wind power generators are disposed on the lower fixing plate rotatably.

13. The system of claim 8, wherein the transverse rods and 45° transverse rods are connected to the socket joints via an adjustable screw.

14. The system of claim 8, wherein the wind catching rods are connected to the socket joints via an adjustable screw.

15. The system of claim 8, wherein the lower fixing plate is fixed to a pillar.

16. The system of claim 8, wherein the aggregator group comprises a plurality of the wind-solar aggregators combined with each other vertically and horizontally.

17. The system of claim 8, wherein the aggregator group comprises eight socket joint-typed wind-solar aggregators.

18. The system of claim 8, wherein two adjacent wind-solar aggregators are combined by a shared side.

19. The system of claim 11, wherein two adjacent wind-solar aggregators are combined by a shared side.

20. The system of claim 8, wherein the system is installed beside a building group.

21. The system of claim 12, wherein two adjacent wind-solar aggregators have a shared socket joint at an adjacent corner.

22. The system of claim 12, wherein the aggregator group comprises a plurality of the wind-solar aggregators combined with each other vertically, in which the lower fixing plate of an upper wind-solar aggregator is the upper fixing plate of a lower wind-solar aggregator.

* * * * *